United States Patent
Bernstein et al.

(10) Patent No.: US 6,509,547 B1
(45) Date of Patent: Jan. 21, 2003

(54) METHOD FOR LASER STRIPPING OF OPTICAL FIBER AND FLAT CABLE

(75) Inventors: Jeffrey Bernstein, Sudbury, MA (US); James Angell, Contoocook, NH (US); Pascal Miller, N. Chelmsford, MA (US)

(73) Assignee: Resonetics, Inc., Nashua, NH (US)

( * ) Notice: Subject to any disclaimer, the term of this patent is extended or adjusted under 35 U.S.C. 154(b) by 35 days.

(21) Appl. No.: 09/723,872

(22) Filed: Nov. 28, 2000

Related U.S. Application Data

(60) Provisional application No. 60/195,568, filed on Apr. 7, 2000.

(51) Int. Cl.$^7$ .............................................. B23K 26/00
(52) U.S. Cl. .......................... 219/121.68; 219/121.79; 219/121.8; 219/121.69; 219/121.85
(58) Field of Search ...................... 219/121.68, 121.79, 219/121.8, 121.69, 121.85

(56) References Cited

U.S. PATENT DOCUMENTS 5,837,961 A * 11/1998 Miller ................... 219/121.68
5,864,114 A * 1/1999 Fukuda .................. 219/121.83

OTHER PUBLICATIONS

Barnier, et al, Fibre Optic Jacket Removal by Pulsed Laser Ablation, Journal of Physics, D. Applied Physics, Apr. 7, 2000, p. 757–9, V. 33 No. 7, H. W. Wilson Company, United Kingdom.

\* cited by examiner

*Primary Examiner*—M. Alexandra Elve
(74) *Attorney, Agent, or Firm*—Devine, Millimet & Branch, P.A.; Paul C. Remus; Todd A. Sullivan

(57) ABSTRACT

This invention results from the realization that a laser can remove the protective layer(s) from the glass or fused silica optical fiber core and cladding more effectively and more reliably than chemical or mechanical means. This invention teaches methods of using laser beams to remove the protective layers of fibers without significantly damaging the optical and mechanical properties of the fiber and without leaving an excessive amount of residual ablation debris on the fiber while providing careful control of the laser energy. This method thereby allows users to safely strip protective layers off sensitive fibers, such as fibers used for fiber Bragg gratings (FBG). This method allows stripping of the protective layers from single fibers and from multi-fiber ribbon cables. It also allows stripping of the protective layers at an end section of the cable or in a middle section (mid-span).

24 Claims, 5 Drawing Sheets

METHOD FOR LASER STRIPPING OF OPTICAL FIBER AND FLAT CABLE

The instant application claims the benefit of U.S. Provisional Application Ser. No. 60/195,568 filed on Apr. 7, 2000.

FIELD OF THE INVENTION

This invention relates to the field of optical fibers. More specifically, to the field of devices for removing protective layers from fiber optic cables. Even more specifically, to the field of devices for removing protective layers from fiber optic cables through the use of laser beams.

BACKGROUND OF THE INVENTION

Optical fibers (also simply referred to as "fibers" in this patent) are made of a core, a cladding layer and one or multiple protective coatings or layers. The core material is typically glass or fused silica and the core diameter ranges from a few microns for single mode fibers to a few hundred microns for multi-mode fibers. A cladding material of lower index of refraction such as glass, fused silica or sometimes plastic surrounds the core. The core and cladding material may each be doped to modify the index of refraction of the material or for some other specialized applications such as fiber amplifier and Bragg grating fibers. Finally the fiber is coated with one or more protective layers such as acrylate, silicon acrylate or other materials. These protective layers increase the fiber's mechanical strength and protect it from physical and environmental damage such as that caused by moisture.

Many fiber optics applications require removal of the protective layer. In one example, fibers are stripped at the ends of the fibers to allow fusion splicing of similar or different fiber types, as in the splicing of a specialty fiber such as an erbium doped fiber to a transmission fiber. Fibers are also stripped at the ends to connect an opto-electronic module such as a transmitter, receiver, transceiver, repeater, regenerator, coupler, or wavelength division multiplexer. Any of these modules may require the connection to be hermetically sealed if it may be exposed to harsh environmental conditions. For instance, a wavelength division demultiplexer may be located on the roof or the wall of a building. Fibers with protective coatings such as acrylate can not be directly used in hermetic seals. Polymer to fused silica interfaces and polymer to metal interfaces do not provide true hermetic seals. These interfaces are loosely bonded and susceptible to leaks and degradations. Most polymers are too permeable and degrade and outgas over time. For a true hermetic seal, the fibers must first be stripped of their protective coatings. The naked fused silica is then metalized by evaporation, sputtering, plating or other appropriate metalization means. The metalized fibers are sealed by soldering, which supplies a true hermetic seal between the metalized fibers and the metal case of the module.

The fiber stripping for these purposes is now usually done mechanically with a wire-stripping type tool or by dipping the fiber in the proper chemical etching bath. These methods have several shortcomings. Thermo-mechanical stripping is limited to single fibers and not applicable to ribbons. Furthermore, it is fairly unreliable as the blades wear with usage resulting in incomplete stripping or mechanical damage to the fiber itself. Chemical stripping requires large amounts of highly corrosive acids, which are environmentally unfriendly. Chemical stripping is a fairly slow process, which takes a few minutes including strip, wash and dry. It may leave residues that lead to poor adhesion of the metal film deposited on the fiber. Chemical stripping is difficult to automate. Furthermore, for mid-span stripping, because there is a minimum of fiber bend radius, when dipping the fiber in the chemical etch bath, the strip length is limited to around 15 mm and longer. Shorter strip length is not possible with chemical stripping.

Stripping of fibers in mid-span may also be required. This stripping is much more difficult to achieve than stripping the end of a fiber. For example, to hermetically seal a module with fibers feeding through the box or the connector, it is necessary to first strip the protective coating in the region where the fibers feed through the module enclosure. As described above, stripped fibers provide much better bonding surfaces for the metallized sealant than the protective layer surrounding the fibers. Fibers may also be stripped as a precursor step to writing Bragg gratings. In addition, if the optical fibers are assembled into flat ribbon cables, stripping of the protective layer from a mid-span section of the cable assembly is very difficult with conventional means such as acid bath or thermo-mechanical stripping.

Lasers have been used widely for stripping insulating layers of conventional copper wires. A laser beam is typically incident on the wire and the insulating layer is removed all the way through to the copper core on the side of the wire which is illuminated by the laser beam. The wire or the laser beam is then rotated to remove the protective layer from the other sides of the wire. In that application, the laser energy at a wide range of levels easily ablates the insulator and leaves the copper undamaged. Note that the removal process is very nonuniform because the insulating layer is removed completely from one side, but is left on the other sides of the fibers. Because the fused silica in the fiber form have optical and mechanical characteristics unlike copper, fibers are easily damaged with a similar non-uniform laser process, at laser ablation levels required to remove the protective coatings. Furthermore, as the fused silica transmits some of the laser energy through the fiber, this energy is focused by the fiber itself thus increasing the energy density of the laser beam inside the fiber and outside the fiber on the side of the fiber opposite the illuminating laser beam (see FIG. 1). Therefore, using lasers for stripping insulation is a much more complex operation with fiber cables than with copper wires. The process of stripping protective layers from fiber optic cable requires a much more "gentle" stripping process than the non-uniform method used for copper wires.

Moreover, for many applications, even more careful control of the laser energy or wavelength delivered by the optical system is required to strip the protective layer without affecting the index of refraction of the fiber core and cladding. For instance, in Bragg grating fibers, the core contains a dopant such as Germanium or the fiber may be loaded with Hydrogen to allow the writing of the grating on the fiber with UV light exposure. The core of this fiber is sensitive to UV light, and therefore, its index changes with UV exposure.

SUMMARY OF THE INVENTION

This invention results from the realization that a laser can remove the protective layer from the fiber core and cladding more effectively and more reliably than chemical or mechanical means, without significantly damaging the optical and mechanical properties of the fiber and without leaving an excessive amount of residual ablation debris on the fiber while providing careful control of the laser energy. This method thereby allows users to safely strip protective layers off sensitive fibers, such as fibers used for fiber Bragg gratings (FBG).

It is therefore an object of this invention that the protective layer of an optical fiber can be removed with minimum degradation of the optical and mechanical properties of the fiber core and cladding materials.

It is a further object of this invention to provide a method for removal of a protective layer from the fiber core and cladding that is more reliable than removal by mechanical means, particularly when mid-span stripping.

It is a further object of this invention to provide a means for the removal of protective layers of ribbon cable.

It is a further object of this invention that the removal of the protective layers can be performed by a dry, non-contact, reliable, and environmentally friendly method.

It is a further object of this invention that the fiber will not be substantially damaged by the removal of the protective layer.

It is a further object of this invention that unacceptable scoring will not be left on the fiber by removal of the protective layer.

It is a further object of this invention that removal of the protective layer will not leave an excessive amount of residual ablation debris on the fiber.

It is a further object of this invention that the laser energy can be sufficiently controlled to allow effective removal of the protective layer from more sensitive fibers, such as Bragg grating fibers.

It is a further object of this invention that removal of the protective layer from fiber in this manner will leave the fiber in proper condition for metalizing and then sealing the fiber, creating an hermetic seal.

BRIEF DESCRIPTION OF THE DRAWINGS

The novel features believed characteristic of the invention are set forth in the claims. The invention itself however, as well as other features and advantages thereof, will be best understood by reference to the description which follows, read in conjunction with the accompanying drawings, wherein:

DETAILED DESCRIPTION OF THE INVENTION

Figure 1:
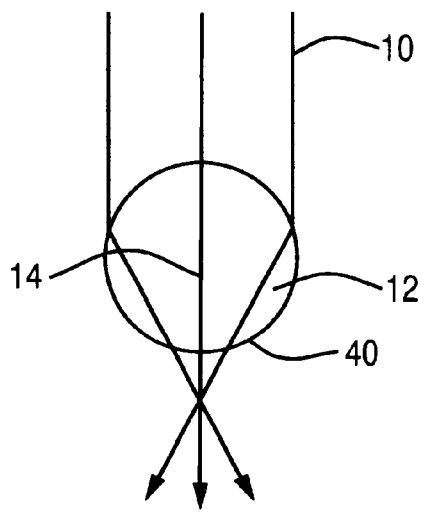
FIG. 1 shows a cross section of optical fiber focusing a laser beam.
Figure 2:
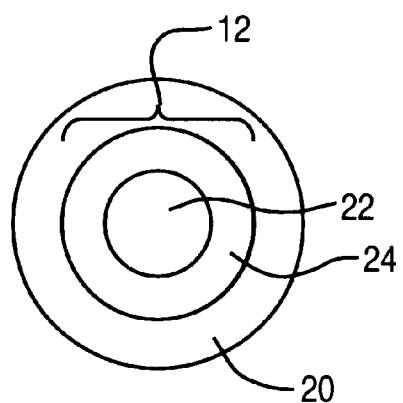
FIG. 2 shows a cross section of multi-mode fiber covered with one or more protective layers.
Figure 3:
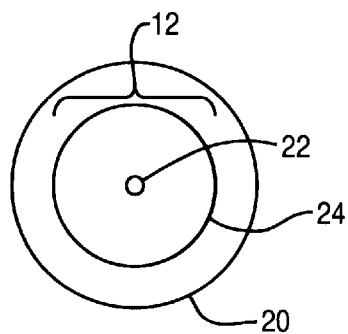
FIG. 3 shows a cross section of single-mode fiber covered with one or more protective layers.
Figure 4:
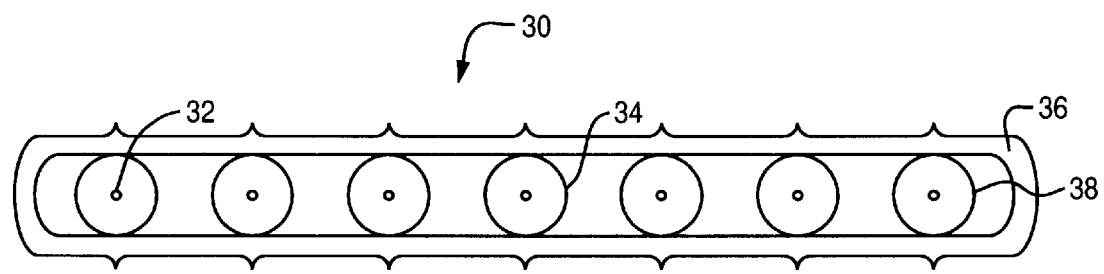
FIG. 4 shows a cross section of fiber ribbon cable.

In the first embodiment, a laser beam 10, in FIG. 1, is impinging on a fiber 12 while the fiber 12 is spun around its axis 14. The laser beam 10 can be generated with an excimer laser, a YAG laser, $CO_2$ laser, diode laser or any other laser source. The laser beam energy density must be sufficient to ablate or remove some of the protective layer 20, in FIGS. 2 and 3, around the fiber 12, but low enough to maintain the fused silica material of the core 22 and cladding 24 undamaged. The laser beam typically removes a small fraction of the total thickness (a few microns typically) of the protective layer 20 at every pass. This protective coating "peeling" process ensures a clean and uniform material removal all around the fiber 12. This technique can be used to remove the protective coating 20 either at the end of the fiber cable 12 (end stripping) or in the middle of the fiber cable 12 (mid-span stripping). The fiber 12 can be translated parallel to its axis 14 to widen the length of the strip area. Fiber ribbon cable 30, in FIG. 4, can be rotated and translated in similar fashion to remove the protective coatings 36 around the core 32 and cladding 34 of each fiber 38 in the ribbon 30.

Figure 5:
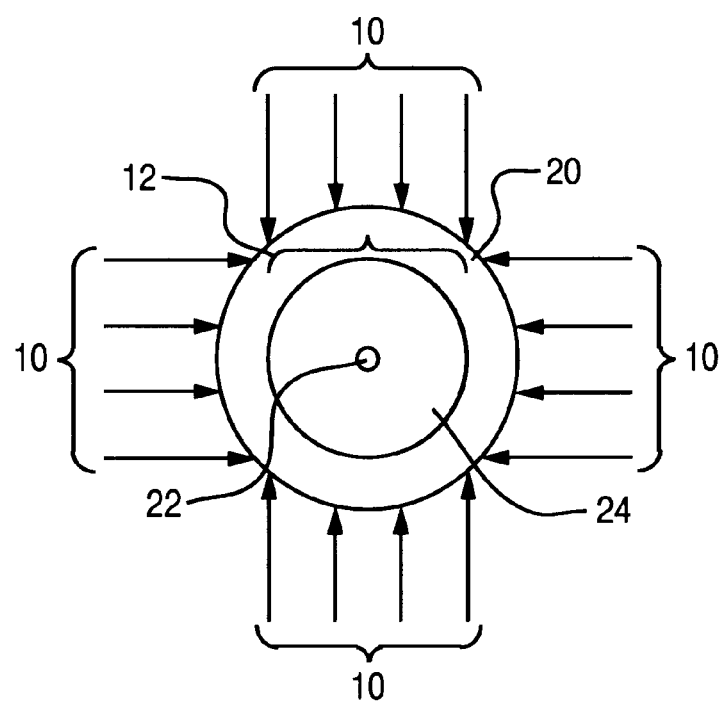
FIG. 5 shows a cross section of fiber covered with one or more protective layers being illuminated on multiple sides by multiple laser beams.

A variation of the present embodiment, shown in FIG. 5, consists of using multiple laser beams 10 (at least two) distributed around the fiber 12. The fiber 12 in this case does not rotate, but each of the laser beams 10 around the fiber 12 fire simultaneously, sequentially or in some other predetermined pattern to remove the protective coating material 20 around the fiber 12. This approach is essentially the same as the former technique except that in this case the fiber 12 is kept fixed and the laser beam 10 is distributed around the fiber 10 to remove and "peel" the protective coating 20 around the core 22/cladding 24. This technique can be used for end of the fiber 12 stripping or to strip a section in the middle of the fiber cable 12. The fiber 12 can also be translated in a direction parallel to its axis 14 to widen the length of the strip area. The technique can also be used to strip a section of fiber ribbon cable 30, in FIG. 4.

When the laser beam 10 reaches the surface of the fiber 12, a portion of the beam 10 is focused through the fiber 12. In particular, if the laser beam 10 is transparent to the fiber 12, a large amount of the laser energy is transmitted through fiber 12. The cylindrical nature of the fiber 12 causes the beam 10 to become strongly focused into a small narrow line on the back side 40 of the fiber 12. Therefore, on the back side 40 of the fiber 12, the laser beam 10 energy density is strongly increased due to this focusing effect. This high laser 10 energy density may result in unwanted laser damage to the fiber 12 material and may actually result in some cases in scoring of the fiber 12 material. An improvement to the above described embodiment consists in minimizing the focusing effect through the fiber 12 as described below, thus eliminating laser damage to the fiber 12.

Figure 6:
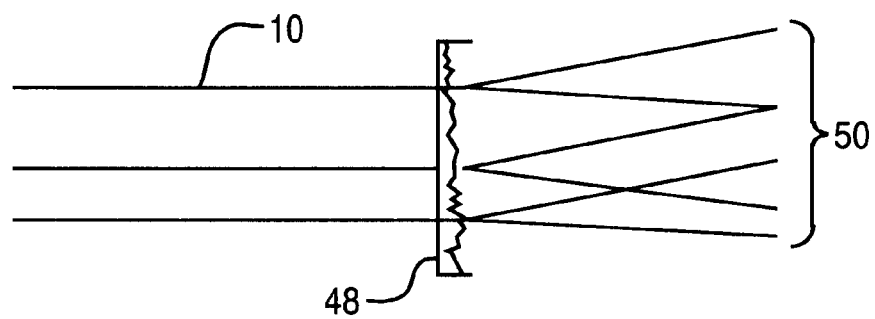
FIG. 6 shows a laser beam being diffused by an optical diffuser.
Figure 7:
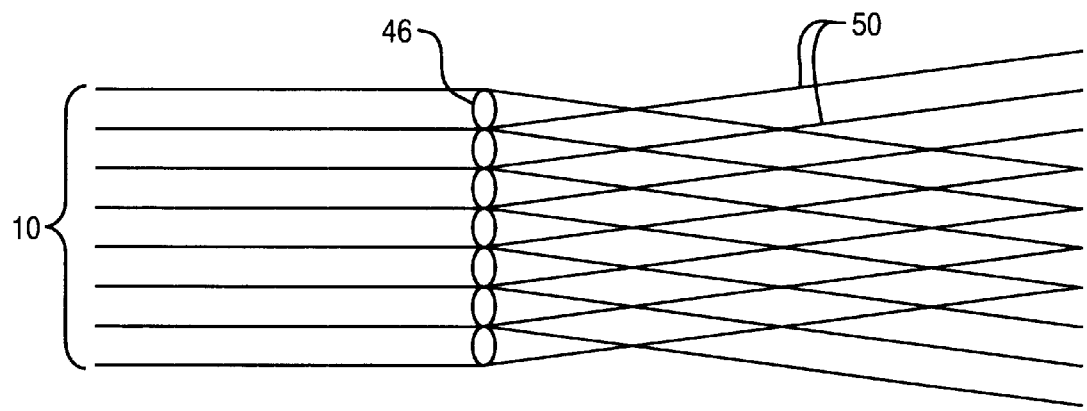
FIG. 7 shows a laser beam being diffused by a lens array.

In one embodiment, the laser beam 10, in FIGS. 6 and 7 is rendered quasi-Lambertian with the use of a spherical lens array or a cross cylindrical lens array 46 or an optical diffuser 48 inserted in the path of the laser beam 10 or any other means that renders a coherent and collimated laser beam 10 quasi-Lambertian in the plane of the fiber 12.

The purpose of diffusing the beam is to increase the angular distribution or radiance. Ideally a Lambertian distribution is created in the plane of the fiber 12. A perfect Lambertian source or illumination is such that the radiance (energy per unit area per unit solid angle) is independent of the angle, in other words, any point in the illuminated area is uniformly illuminated from all directions. (Reference: Elements of Modern Optical Design, Donald C. O'Shea, John Wiley and Sons, 1985, pp 92–93). In practice, this is not truly possible but this invention approximates the concept. This illumination is referred to as "quasi-Lambertian".

With a quasi-Lambertian illumination, the focusing effect of the beam 10 as it propagates into the fiber 12 is greatly reduced. Therefore, the damage to the fiber 12 is greatly reduced if not totally eliminated and the ablation is much more uniform as well.

There are different methods to render a laser beam 10 quasi-Lambertian.

Figure 10:
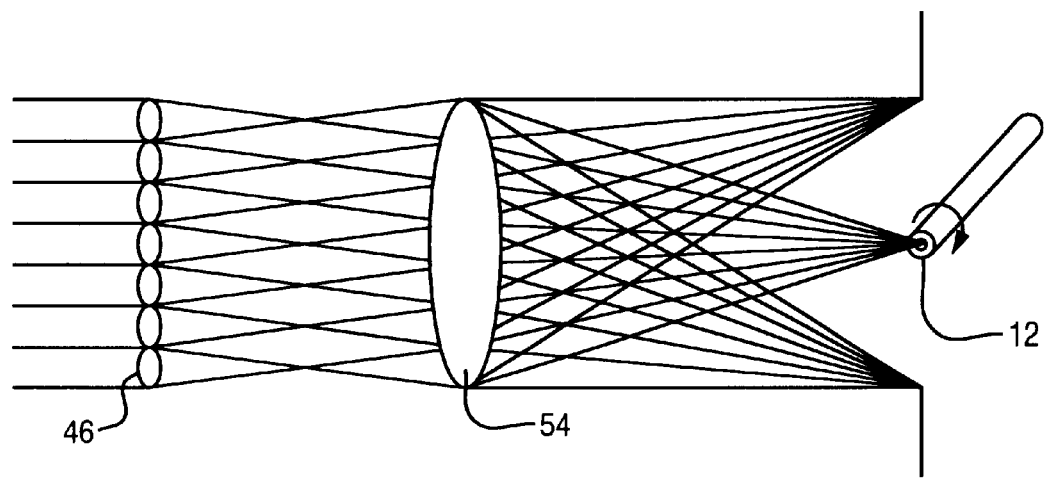
FIG. 10 shows homogenization of a laser beam.

One method to render a beam 10 quasi-Lambertian is to use an optical diffuser 48 or a two-dimensional spherical lens array or cross cylindrical lens arrays 46. These methods are generally referred to, in this field, as "beam homogenizing" techniques. (This is because these techniques are also used to homogenize, i.e. make more uniform, the intensity distribution of the laser beam over some area.) These methods use one or more optical elements (such as the diffuser 48 or the lens array 46) to divide or break the beam 10 into many small beamlets. The multiple small beamlets are recombined in one plane with the use of a condenser lens 54 (see FIG. 10). Because the beamlets are recombined at different angles, the angular distribution or radiance of the beam is greatly increased. Therefore, the laser beam homogenizer (46 or 48) is the preferred method to render the laser beam 10 quasi-Lambertian. With a diffuser 48 (typically a roughened piece of glass or fused silica), the beamlets are totally randomly distributed and a large amount of the energy is lost at high angles and in backscattering and this light is not collected through the condensor lens 54. With a spherical or cylindrical lens array 46, the beam is divided in a discrete and well controlled number of little beamlets that are all recollected through the condensor lens 54. With this method very little laser energy is lost through the optical system.

Another method to render the beam 10 quasi-Lambertian is to use multiple beams 10 (at least two). This is effectively another way to render the beam less directional, i.e. more quasi-Lambertian. By using multiple beams 10 incident on the fiber 12 from different directions, one can basically recreate a quasi-Lambertian illumination with therefore the same benefit, namely reducing laser damage due to focusing through the fiber 12 and more uniform ablation process. This can be done either by using multiple laser sources, or with using one laser source and dividing the beam 10 into multiple branches with beamsplitters (i.e. partially transmissive, partially reflective optical elements) or edge mirrors (i.e. mirrors that only reflect a small fraction of the beam area, while transmitting the rest of the beam). Each of the little beams 10 is then manipulated with individual optical components such as mirrors and lenses and impinge on the fibers 12 from different directions. Note that in this case, each beam 10 follows a separate path and are recombined in the plane of the fiber 12 from different directions substantially uniformly distributed around the fiber. By dividing the laser power density between multiple laser beams, the damaging effect due to focusing of each beam through the fiber is greatly reduced.

Figure 8:
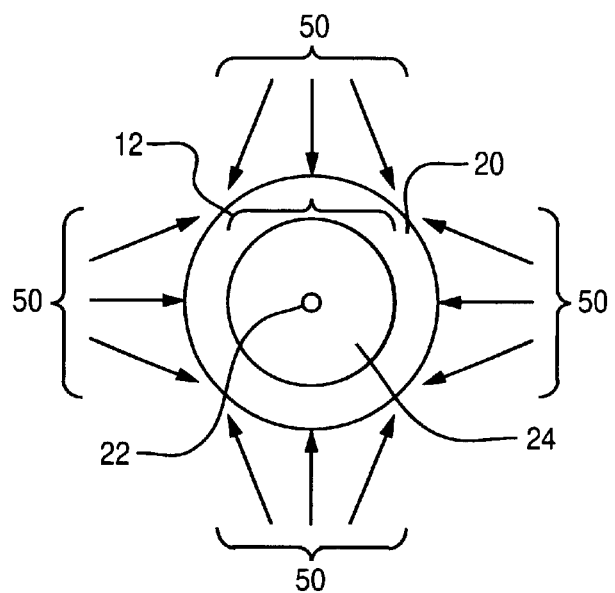
FIG. 8 shows a cross section of fiber covered with one or more protective layers being illuminated on multiple sides by multiple laser beams quasi-Lambertian at the fiber.

When the laser beam 10 is quasi-Lambertian at the plane of the fiber 12, the effect of focusing through the fiber 12 is minimized. Note that the diffused beam 50 must be quasi-Lambertian rather than just divergent or convergent. Indeed, if the beam 10 is made convergent with the use of a focusing lens for instance, at the level of the fiber 12, which is only about 125 microns in diameter, the rays are almost parallel and the beam 10 is quasi-collimated as seen through the fiber 12; thus, it still exhibits the focusing effect. In the present embodiment, which utilizes a quasi-Lambertian laser beam 50, the fiber 12 is rotated to remove the protective coating 20 around the fiber 12. Alternatively, in FIG. 8 multiple quasi-Lambertian laser beams 50 (at least two) can be distributed around a circumference of a cross section of the fiber 12 to remove the protective coating 20 all around the fiber 12 circumference. Each method can be used to strip the protective layers 36 from ribbon cable 30. In either case, the damage to the fiber 12 material due to the laser beam 50 can be eliminated or at least strongly reduced as compared to the untreated quasi-collimated laser beam 10. The quasi-Lambertian laser beam 50 technique represents an alternative to the embodiments described above to strip protective coatings 20/36 off fiber 12/38.

One specific use of this inventive method involves using an excimer laser beam 10 either with a wavelength of 248 nm (KrF excimer gas) or with a wavelength of 308 nm (XeCl excimer gas). The laser beam 10 is pulsed at a repetition rate between 100 Hz and 200 Hz. This laser 10 delivers between 200 and 600 mJ of laser energy in 15 to 25 ns pulse width. The laser beam 10 is homogenized with two cross-cylindrical lens arrays 46 and a condenser lens 54. The beam 10 finally is focused through a final lens which reduces its size four times in order to increase the fluence (i.e. the energy per unit area). The fluence or energy density of the beam 10 is between 0.3 and 1 $J/cm^2$ in the plane of the fiber 10. The single fiber 10 or the multi-fiber ribbon 30 is mounted on a lathe type apparatus and spun around the axis 14 of the fiber 10 with a rotation rate of approximately 300 revolutions per minute (rpm). Between 200 and 2000 pulses are fired on the fiber 10 while the fiber 10 is spun. Under these conditions, the protective coating 20 of a standard SMF28 optical fiber 10 is removed (125 micron core diameter, 250 micron protective coating 20 diameter) and, at most, minimal damage is done to the mechanical and optical properties of the fiber 12.

Figure 9:
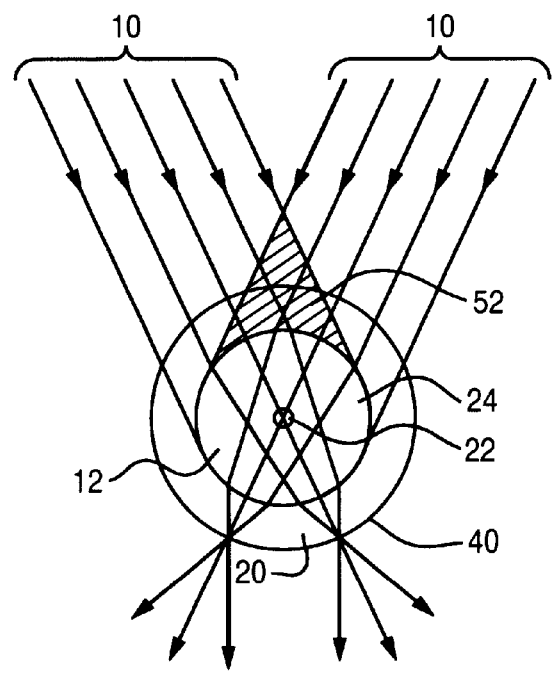
FIG. 9 shows the cross section of an ablation of the protective layer on a fiber by overlapping laser beams.

In yet another embodiment, in FIG. 9, two or more laser beams 10 simultaneously impinge on the surface of the fiber 12 at some angle (below 90 degrees) with respect to each other, preferably in a plane substantially perpendicular to the fiber axis 14. The beams 10 are arranged to overlap in a region 52 on the entrance side of the beam 10 in the fiber 10. The energy of the two beams 10 adds together in the overlap region 52 on the entrance side through the fiber 12 and provides sufficient energy density to ablate the protective coating material 20, but is low enough such that it does not create any damage to the fused silica core 22 and cladding 24 of the fiber 12. On the back side 40 of the fiber 12 there is no overlap, the two beams 10 are separated as they exit the fibers 12. Although each laser beam 10 exhibits focusing as it passes through the fibers 12, the beams 10 remain separate on the back side 40 and the energy of the separate lasers 10 does not accumulate on the back side 40 of the fiber 12. On the back side 40, the energy of each of the laser beams 10 is maintained low enough such that it does no damage to the fused silica material of the fiber 12. The reason the energy of the laser 10 can be maintained at a low level, on the back side 40, is that the energy level of the separate beams 10 at the overlapping region 52 can be maintained below the ablation threshold of the protective layers 20. Thus ablation would only occur on the protective layers 20 where the separate laser beams 10 overlap. The fiber 12 is rotated around its axis 14 such that the overlapping laser beams 10 remove the protective layers 20 off the fiber 12. The fiber 12 can be rotated continuously, while the laser beams 10 are firing, or rotated one or more times between intermittent firing times of the laser beams 10. Alternatively, overlapping laser beams 10 are distributed around the fiber 12 and simultaneously or sequentially fire in order to remove the protective coating 20 off the fiber 12. These methods can all be used on ribbon cable 30. The overlapping beam technique represents an alternative over the embodiments described earlier.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A stripping method for removing one or more protective layers of an optical fiber cable from a core and a cladding of the cable comprising:

using at least one laser beam directed at the cable with an angular distribution quasi-Lambertian at the cable; and rotating the cable, in relation to the laser beams, on an axis substantially parallel to the cable axis.

2. The method of claim 1 further comprising homogenizing at least one of the laser beams using at least one item within the group of:

an optical diffuser;

a lens array; and cross cylinder arrays.

3. The method of claim 1 wherein the optical fiber cable is a ribbon cable composed of multiple fibers.

4. The stripping method of claim 1 wherein the laser beams are directed at a mid-section of the cable.

5. A stripping method for removing one or more protective layers of an optical fiber cable from a core and a cladding of the cable comprising:

using at least one laser beam directed at the cable; and rotating the cable, in relation to the laser beams, on an axis substantially parallel to the cable axis.

6. A stripping method for removing one or more protective layers of a cable from a core and a cladding of the cable comprising:

using at least two laser beams of individual energy levels below ablation threshold of the protective layers and below ablation threshold of the core and cladding and of combined energy levels at least attaining the ablation threshold of the protective layers;

positioning each laser beam to impinge upon and pass through the cable such that each laser beam has a predetermined surface area entry position and predetermined surface area exit position;

positioning the lasers collectively so that each laser beam's predetermined surface area entry position at least partially overlaps the surface area entry position of one or more other laser beams and each laser beam's predetermined surface area exit position is exclusive of every other laser beam's predetermined surface area exit position.

7. The stripping method of claim 6 wherein at least one of the laser beams is directed at the cable with an angular distribution quasi-Lambertian at the cable.

8. The method of claim 7 further comprising homogenizing at least one of the laser beams using at least one item within the group of:

an optical diffuser;

a lens array; and cross cylinder arrays.

9. The stripping method of claim 6 wherein the cable, in relation to the laser beams, is at least partially rotated axially while at least two of the laser beams are active.

10. The stripping method of claim 6 wherein the laser beams, in relation to the cable, are at least partially rotated axially while at least two of the laser beams are active.

11. The stripping method of claim 6 wherein the cable, in relation to the laser beams, is at least partially rotated substantially axially between multiple uses of at least two of the laser beams on a cross-sectional area of the cable.

12. The stripping method of claim 6 wherein the laser beams, in relation to the cable, are at least partially rotated substantially axially between multiple uses of at least two of the laser beams on a cross-sectional area of the cable.

13. The method of claim 6 wherein the optical fiber cable is a ribbon cable composed of multiple fibers.

14. The stripping method of claim 6 wherein the laser beams are directed at a mid-section of the cable.

15. A stripping method for removing one or more protective layers of an optical fiber cable from a core and a cladding of the cable comprising:

using multiple laser beams distributed substantially uniformly around the cable thereby allowing a circumference of a cross-sectional area of the cable to be ablated without rotating the cable or moving a single laser beam about the cable; and wherein at least one of the laser beams is directed at the cable with an angular distribution quasi-Lambertian at the cable.

16. The method of claim 15 wherein the optical fiber cable is a ribbon cable composed of multiple fibers.

17. The stripping method of claim 15 wherein the laser beams are fired simultaneously.

18. The stripping method of claim 15 wherein the laser beams are turned on in repeated serial order and turned off in repeated serial order.

19. The stripping method of claim 15 wherein the laser beams are fired in repeated order whereby the protective layers are removed in a uniform manner.

20. The stripping method of claim 15 wherein the laser beams are directed at a mid-section of the cable.

21. The stripping method of claim 15 comprising homogenizing at least one of the laser beams using at least one item within the group of:

an optical diffuser;

a lens array; and cross cylinder arrays.

22. A stripping method for removing one or more protective layers of an optical fiber cable from a core and a cladding of the cable comprising:

using at least one laser beam directed at the cable wherein at least one of the laser beams is directed at the cable with an angular distribution quasi-Lambertian at the cable; and homogenizing at least one of the laser beams using at least one item within the group of:

an optical diffuser;

a lens array; and cross cylinder arrays.

23. A stripping method for removing one or more protective layers of an optical fiber cable from a core and a cladding of the cable comprising:

using at least one laser beam directed at the cable with an angular distribution quasi-Lambertian at the cable; and moving the laser beams about the cable such that the laser beams impinge the cable from different directions about the cable.

24. The method of claim 23 further comprising homogenizing at least one of the laser beams using at least one item within the group of:

an optical diffuser;

a lens array; and cross cylinder arrays.

* * * * *